United States Patent
Hotz, Jr. et al.

[11] 3,788,628
[45] Jan. 29, 1974

[54] PNEUMATIC ISOLATOR

[75] Inventors: Kenneth J. Hotz, Jr., Chatsworth; Edward Steiner, Sun Valley; Gary L. Fox, Los Angeles, all of Calif.

[73] Assignee: Barry Wright Corporation, Watertown, Mass.

[22] Filed: Nov. 10, 1972

[21] Appl. No.: 305,373

[52] U.S. Cl............... 267/65 R, 213/43, 188/298, 74/18.2
[51] Int. Cl............................................. B60g 11/26
[58] Field of Search.......... 267/65 R, 65 B; 213/43; 188/298, 322, 314, 315; 74/18.2

[56] References Cited
UNITED STATES PATENTS

| | | | |
|---|---|---|---|
| 3,031,180 | 4/1962 | Sergay | 267/65 R |
| 3,046,003 | 7/1962 | Schultz | 267/65 B |
| 3,157,396 | 11/1964 | Long | 267/64 |
| 3,171,643 | 3/1965 | Roos | 267/65 R |
| 3,468,433 | 9/1969 | Peterson | 213/43 |
| 3,627,297 | 12/1971 | Gaydecki | 267/65 B X |
| 3,679,069 | 7/1972 | Shaver | 213/43 |
| 3,726,419 | 4/1973 | Anderson et al. | 213/43 |

FOREIGN PATENTS OR APPLICATIONS
1,029,290 5/1966 Great Britain .................. 267/65 B Primary Examiner—Robert G. Sheridan
Assistant Examiner—R. B. Johnson
Attorney, Agent, or Firm—Schiller & Pandiscio; Milton E. Gilbert, Esq.

[57] ABSTRACT

A pneumatic spring device of the type embodying a rolling sleeve seal comprising improved means for clamping and hermetically sealing the ends of the seal to two members that are capable of displacement relative to one another. Each clamping means comprises a pair of cooperating sealing members that engage opposite sides of an end of the seal and have unique rib-groove configurations that produce a strong gripping action without damaging the seal or so distorting it as to increase its likelihood of failure under continuous and changing loads.

15 Claims, 4 Drawing Figures

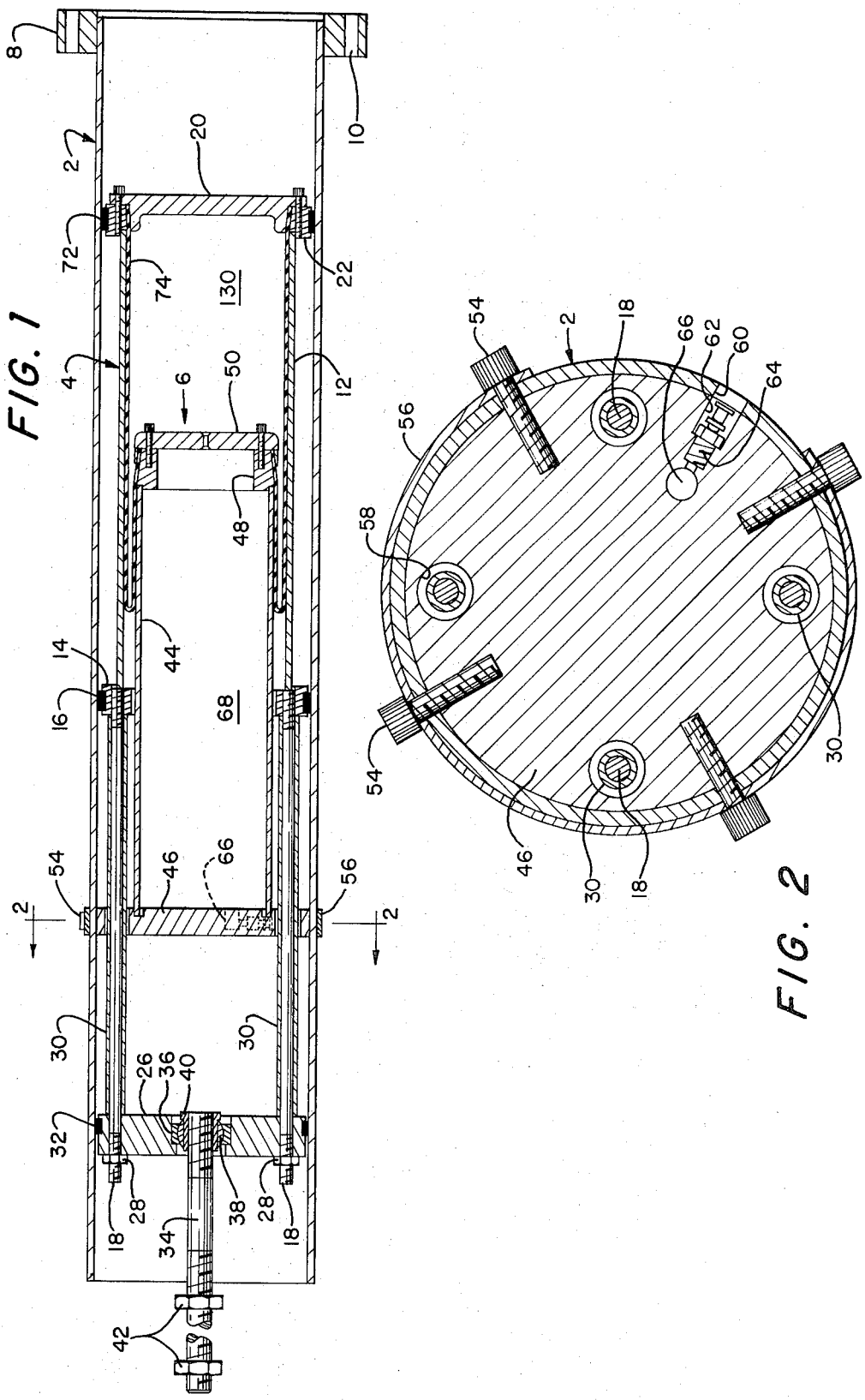

PNEUMATIC ISOLATOR

This invention pertains to means for attenuating mechanical shock and vibrations and more particularly to an improvement in pneumatic shock and vibration isolators.

A number of pneumatic spring systems useful as vibration and shock isolators are known to persons skilled in the art. Such isolators are available in a wide variety of sizes and load capacities and can be designed with special characteristics so as to provide shock and vibration protection for virtually any type of equipment or structure, e.g., machinery, electronic systems, piping and pipelines, etc. The present invention is concerned with pneumatic isolators of the type that embody rolling sleeve seals.

Rolling sleeve seal pneumatic springs offer the specific advantages of constant effective area, low spring rates, relatively small size since high gas pressures can be used, relatively low friction, outstanding shock and vibration isolation, and variable load carrying capacity over a wide range. However, it has been determined that the useful life of such devices frequently is terminated by failure of the rolling sleeve seal, notably at one of its ends. This problem is most severe in devices that are intended to attenuate massive forces and large amplitude motions as encountered in earthquakes and high impact explosions. Such devices typically are required to operate at pneumatic pressures in excess of 500 psi. and to have load capacities and deflections as high as 20,000–50,000 pounds and ± 15–20 inches. The stresses imposed during these operating conditions are a primary cause of the failures of the rolling sleeve seals. In this connection it is to be noted that the failures usually consist of detachment of one end or the other of the rolling sleeve seal, but in some cases it is due to deterioration of an end of the sleeve seal.

Accordingly the primary object of this invention is to provide improved pneumatic isolators of the type embodying rolling sleeve seals.

Another object is to provide improved means for anchoring the ends of rolling sleeve seals.

A third object is to provide pneumatic vibration and shock isolators that are capable of relatively large loading capacities and deflections and have relatively long useful lifetimes.

Another object is to provide isolators of the type described that have measured response frequencies in the range of 0.4 Hz to 1.0 Hz, with damping in the range of 10–25 percent of critical, in the preferred embodiment.

A further object is to provide an improved pneumatic isolator that is characterized by controlled damping.

Still another object is to provide an improved pendulum type pneumatic isolator.

A still further object of the invention is to provide in a pneumatic isolator sealing means which substantially eliminates leakage of fluid from a pressurized chamber having an expansible element, so that it may be used as a passive isolator.

Described briefly the improvement offered by the present invention comprises provision of novel means for clamping the ends of a rolling sleeve seal, the clamping means in each case comprising a pair of cooperating members that engage opposite sides of a seal end and have unique rib-groove or toothed configurations that produce a strong positive gripping action without damaging the seal or so distorting it as to increase its likelihood of failure under continuous and changing stresses. Other features and many of the attendant advantages of the invention are disclosed by the following description of a preferred embodiment of the invention which is to be considered together with the drawings wherein:

FIG. 1 is a longitudinal sectional view of a pendulum-type pneumatic isolator constituting a preferred embodiment of the invention;

FIG. 2 is a cross-sectional view taken along line 2 — 2 of FIG. 1; and

Figure 3:
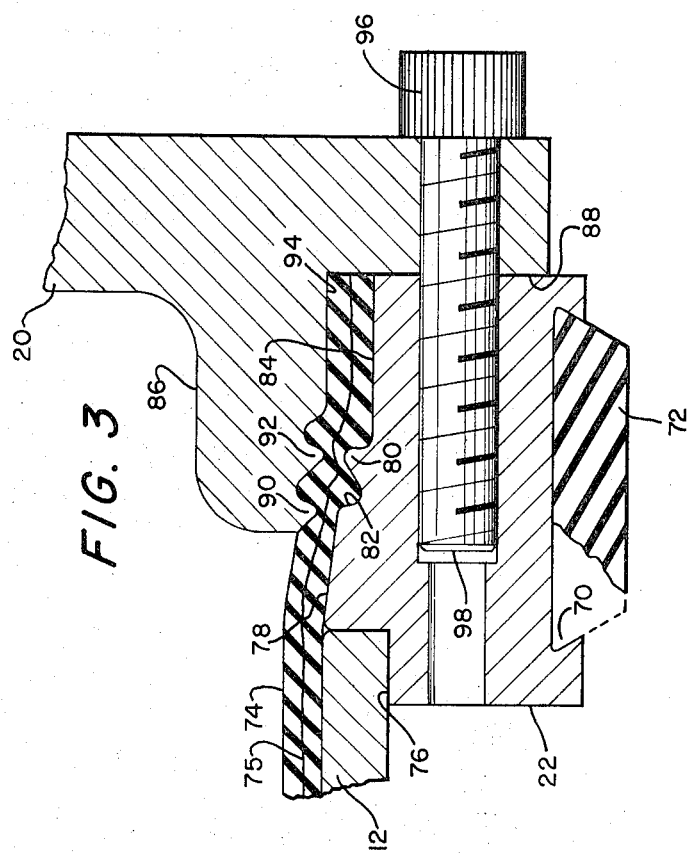
FIGS. 3 and 4 are fragmentary views on an enlarged scale showing how the rolling sleeve seal of the device of FIG. 1 is anchored according to the present invention.

Referring now to FIG. 1, the illustrated embodiment of the invention comprises a housing 2, a load cylinder assembly 4, and a damping chamber assembly 6. The housing is in the shape of a cylinder that is open at both ends and has a circular flange 8 surrounding and welded to one end. Flange 8 is provided with a series of evenly spaced holes 10 to accommodate bolts (not shown) for attaching the device to a suitable support or structure.

The load cylinder assembly 4 comprises a cylinder 12 having a circular tension rod flange 14 welded to one end as shown. Flange 14 is in the shape of an annulus and is provided with a peripheral groove in which is mounted a ring 16 made of a nylon, or other suitable low friction material. The ring 16 is so shaped (see FIG. 3) that it is retained in the groove in flange 14 after assembly. The outer surface of ring 16 presents a cylindrical surface and its diameter is such that upon assembly the ring makes a loose sliding fit with the interior surface of the housing 2. Tension rod flange 14 is provided with four equally spaced tapped holes into which are screwed four tension rods 18 (see also FIG. 2). The opposite end of load cylinder 14 is closed off by an end cap 20 and a seal flange 22. Further details of end cap 20 and seal flange 22 are presented hereafter with reference to FIG. 3.

The opposite ends of the four tension rods 18 are coupled to a pendulum rod anchor plate 26. The latter has four equally spaced holes to accommodate the ends of rods 18 which are threaded as shown to receive nuts 28. Mounted on each of the tension rods 18 is a tube 30. The nuts 28 are set so that the tubes 30 are compressed between tension rod flange 14 and anchor plate 26. As is apparent from the above description, the load cylinder assembly 4, rods 18, tubes 30 and anchor plate 26 form an integral unit that is moveable along the housing 2. In this connection it is to be noted that anchor plate 26 has a peripheral groove like that of tension rod flange 14 and that a suitable ring 32 similar to ring 16 is disposed in that groove. Ring 32 also is shaped so as to make a loose sliding fit with the inner surface of the housing 2.

A pendulum rod 34 is attached to anchor plate 26 by a swivel joint connection. For this purpose the plate 20 is provided with a center hole in which is anchored a bearing assembly comprising a ring or race 36 and a ball 38.

Race 36 and ball 38 are connected so that the latter can rotate in a modified universal manner, i.e., it can rotate a full 360° about the longitudinal axis of housing 2 and can also rotate ±10° about any axis perpendicular to the longitudinal axis. The ball 38 has a diametrically extending bore in which is secured a nut 40. One end of pendulum rod 34 is screwed into nut 40. The opposite end of rod 34 is threaded to receive a pair of nuts 42. The rod 34 is connected to the ceiling, sometimes by means of a pendant.

The damping chamber assembly 6 comrpises a cylindrical tube 44 which is welded at one end to an end plate 46 and at the opposide end to a sealing ring 48. The latter end of tube 44 is closed off by an orifice plate 50. Details of sealing ring 48 and orifice plate 50 are described below with reference to FIG. 4. The end plate 46 is sized to make a snug fit with the inner surface of housing 2 and is provided with four radially extending tapped holes to receive screws 54 (FIGS. 1 and 2) that serve to lock it to the housing. A reinforced ring 56 surrounds the housing in line with end plate 46 and has holes aligned with the holes in end plate 46 through which extend the screws 54. End plate 46 has 4 equally spaced longitudinally extending holes 58 that are aligned with the four tension rods 18 and are oversized with respect to the tubes 30 so that the load chamber assembly can reciprocate longitudinally within the housing 2.

As seen in FIG. 2, the reinforcing ring 56 is split and extends approximately 320° around the housing. In between the ends of ring 56 the housing is provided with a hole 60. The latter is aligned with a counterbored radial hole 62 in end plate 46 which is threaded to receive a self closing air valve 64. By way of example, valve 64 may be a tire valve. The bore 62 communicates with a cavity 66 in end plate 46. Cavity 66 is open to the interior of tube 44 and functions as an inlet port for the damping chamber 68.

Referring now to FIG. 3, the seal flange 22 has a peripheral groove 70 whose sides are inclined as shown and disposed in the groove is a low friction ring 72. The ring 72 is so shaped as to be retained in the seal flange 22 and so that its outer surface makes a loose sliding fit with the interior surface of housing 2. Although not shown in detail, it is to be noted that the rings 16 and 32 are shaped like ring 72 and that the grooves in which they are disposed have the same cross-sectional configuration as groove 70.

A flexible rolling sleeve seal 74 is disposed between the load chamber assembly and the damping chamber assembly. Sleeve seal 74 is made of a suitable material, e.g., a textile fabric impregnated with a natural or synthetic elastomer such as natural or silicone rubber or an elastomer reinforced with cords 75 which may be of nylon. The seal is substantially non-stretchable under the pressures to which the device is normally subjected, e.g., pressures up to about 800 psi. A more detailed description of the composition of seal 74 is not believed necessary since such seals are well known in the art and since seals of various compositions may be used in practicing this invention. The ends of the seal are secured to the tubes 12 and 44 at the seal flange 22 and sealing ring 48 by an arrangement now to be described.

The inner surface of seal flange 22 is formed with a groove 76 to receive the end of the tube 12 which is welded in place, a longitudinally slanted or frusto-conical surface portion 78 which at one end is flush with the outer surface of tube 12, a circumferential rib 80 having the general shape of a saw-tooth in cross-section and spaced from surface portion 78 by a circumferential groove 82, and a cylindrical coaxial surface portion 84. As seen in FIG. 3, the side of rib 80 nearest tube 12 is inclined away from that tube (preferably at an angle of about 55° to surface portion 84) while its second or opposite side is inclined slightly in the opposite direction but is nearly at a right angle to surface portion 84. Preferably this latter side of rib 80 extends at an angle of about 95° to surface portion 84. Further, the junction of the two sides of rib 80 is blunt or rounded a shown. The groove 82 is similar to rib 80 in cross-sectional configuration, and preferably its shorter side wall extends at an angle of about 95° to the cylindrical surface of portion 84 and at an angle of about 60° to its opposite side wall which is in the inclined side of rib 80. The base of groove 82 also is rounded as shown, and preferably it has a radius of curvature like that of the junction of the two sides of rib 80. The latter junction is located further from the center axis of sealing flange 22 than the adjacent end of the slanted surface 78 and preferably the rib 80 is located so that it would be tangent to a projection of tapered surface 78. The latter surface preferably extends at an angle of about 5° relative to cylindrical surface 84.

The end cap 20 is provided with a circular flange 86 on its inner side and is undercut as shown to provide a flat annular surface 88 which fits flat against the adjacent flat end surface of seal flange 22. The outer circumferential surface of flange 86 is formed with two ribs 90 and 92 and a cylindrical surface portion 94. Each of the ribs 90 and 92 has a cross-sectional shape similar to rib 80. The longer inclined sides of ribs 90 and 92 preferably extend at an angle of about 45° relative to the cylindrical surface 94 and the opposite sides of the ribs are slanted in the opposite direction at an angle of about 15° to the plane of surface 88 which is disposed at a right angle to the center axis of end cap 20 and tube 12. Thus the opposite sides of each of the grooves formed between ribs 90 and 92 and rib 92 and cylindrical surface 94 converge at an angle of about 60°. The bases of these grooves preferably have the same radius of curvature as the junctions of the opposite sides or ribs 90 and 92. Additionally, rib 92 is further than rib 90 from the center axis of the end cap and the two ribs are disposed so that as viewed in FIG. 3 a line drawn tangent to their rounded ends will intersect the cylindrical surface 94 at an angle of about 5°. In other words, a line drawn tangent to the rounded ends or ribs 90 and 92 as seen in FIG. 3 will be substantially parallel to the surface 78. Preferably the same is true of a line drawn tangent to the bases of the two grooves in flange 86. Flange 86 is spaced from the seal flange 22 so as to provide an annular gap in which one end of the rolling sleeve seal 74 is disposed. Preferably seal flange 22 and end cap 20 are designed so that the gap between the cylindrical surfaces 84 and 94 exceeds the wall thickness of the sleeve seal in its as-formed condition. Similarly, the gap between the seal flange 22 and end cap 20 in the regions of the grooves on either side of the rib 92 exceeds the normal or asformed thickness of the sleeve seal. On the other hand, the gap between (a) rib 90 and surface 78 and (b) rib 92 and rib 80 are substantially less than the as-formed thickness of the sleeve seal. In this connection it is to be noted that rib 80 and groove 82 are located so as to be substantially in diametrical alignment with rib 92 and the groove formed between ribs 90 and 92 respectively when end cap 20, seal flange 22 and sleeve seal 74 are interfitted as shown and secured in place by a plurality of screws 96 that extend through suitably located holes in end cap 20 and are screwed into tapped holes 98 in seal flange 22. The end portion of the seal 74 between flange 86 and seal flange 22 is expanded diametrically and is also subjected to forces that (a) compress it in the regions of the narrow gaps between ribs 90 and 92 on the one hand and tapered surface 78 and rib 80 on the other hand and (b) extrude it into the relatively large gaps between (1) groove 82 and the opposing groove of flange 86, (2) the second groove in flange 86 and surface 84, and (3) surface 84 and the surface 94. The overall result is that the end of the sleeve seal is securely gripped by seal flange 22 and flange 86 of end cap 20 in a manner which does not injure the seal, prevents it from pulling loose under pressures as high as 2000 psi, and assures against leakage of fluid between the sleeve seal and end cap. The general sawtooth cross-sectional configuration of the ribs and grooves is significant since when the sleeve seal is subjected to tension those sides of the ribs that are more nearly at right angles to ths axis of tube 12 act to restrain the sleeve seal against relative longitudinal movement.

Figure 4:
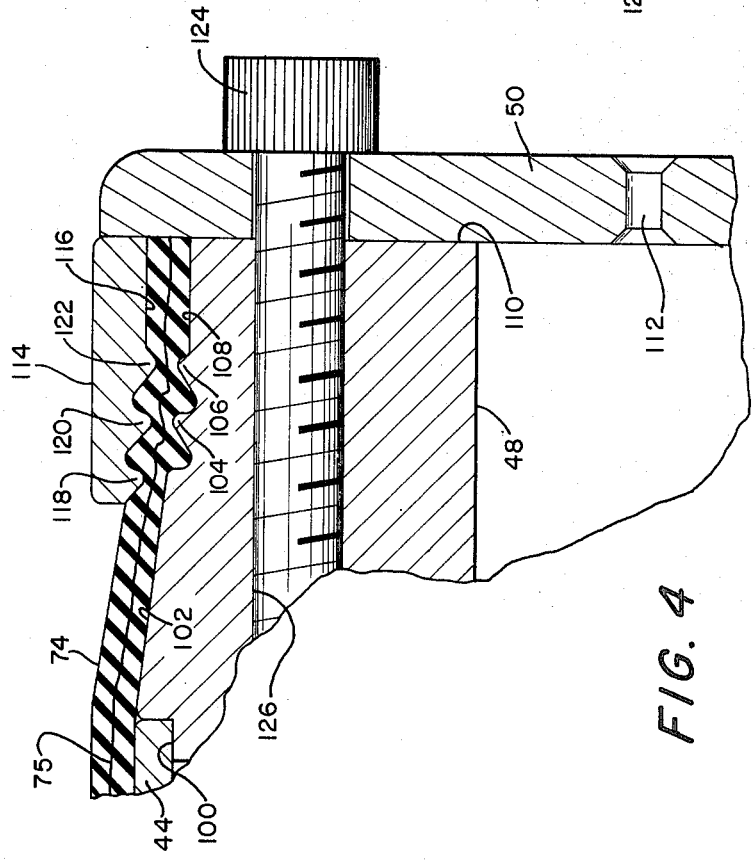

Turning now to FIG. 4, a similar gripping action is provided with respect to the opposite end of the sleeve seal. In this case the outer surface of sealing ring 48 has a groove 100 to receive the end of tube 44 which is welded in place, and also comprises a tapered or frustoconical surface portion 102, a pair of ribs 104 and 106, and a cylindrical surface portion 108. Preferably the surface portion 102 extends at an angle of about 7° with respect to the center axis of sealing ring 48 and the ribs 104 and 106 are arranged so as to be tangent to a projection of tapered surface 102. Preferably also the diameter of the cylindrical surface section 108 is such that a line tangent to the ribs 104 and 106 will intersect it near or at its junction with the flat end surface 110 of sealing ring 48. Preferably, the ribs 104 and 106 have the same cross-sectional configuration as the rib 80 described previously, i.e., their shorter sides extend at an angle of about 5° relative to the end surface 110 (which is at a right angle to the axis of the sealing ring) and at an angle of about 60° relative to their longer inclined sides, while the junctions of their opposite sides are rounded as shown. The grooves between surface 102 and rib 104 and between rib 104 and rib 106 have substantially the same cross-sectional shape as groove 82 described above. Preferably these grooves are formed so that a line drawn tangent to their bases will be substantially parallel to surface 102 as seen in FIG. 4. The orifice plate 50 has a small orifice, or may have multiple orifices, in the form of a through bore 112 whose ends are flared or countersunk as shown. Alternatively such ends may be either straight or radiused. A sealing ring 114 butts against the inner face of orifice plate 50 and has an inner surface which comprises a cylindrical section 116 and three ribs 118, 120 and 122. Preferably the latter have cross-sectional configurations like that of ribs 90 and 92, i.e., their longer sides are slanted at an angle of about 45° to the center axis of ring 114 and their opposite sides are slanged in the opposite direction at an angle of about 15° to the plane of end surface 110. Thus the opposite sides of each of the ribs converge at an angle of about 60°. Ribs 118, 120 and 122 are progressively closer to the center axis of ring 114 and preferably are arranged so that a line tangent to them will be substantially parallel to surface 102. The two grooves formed between these ribs have substantially the same cross-sectional shape as the groove formed between ribs 90 and 92 and preferably are formed so that a line drawn tangent to their bases will also be substantially parallel to surface 102. These grooves are located so as to be in substantial diametrical alignment with the two grooves between surface 102 and rib 104 and between ribs 104 and 106 when the orifice plate is brought tight against surface 110. Ribs 120 and 122 are located so as to be in the same relation to ribs 104 and 106.

The sealing rings 48 and 114 are sized so that a space exists between to receive the rolling sleeve seal 74. Further the gaps between (a) rib 118 and surface 102, (b) ribs 104 and 120, and (c) ribs 106 and 122 are less than the as-formed thickness of the sleeve seal, while the gaps between the confronting grooves and between surfaces 108 and 116 are greater than the as-formed thickness of the sleeve seal. Consequently when the end of rolling sleeve seal 74 is sandwiched between sealing rings 48 and 114 and the orifice plate brought up tight against surface 110, the sleeve seal will be gripped by said sealing rings in the same manner as its opposite end is gripped between seal flange 22 and flange 86 of end cap 20. It is to be noted that orifice plate 50 is secured to sealing ring 48 by a plurality of screws 124 which extend through suitable holes in the orifice plate and are screwed into tapped holes 126 formed in sealing ring 48.

Since as described above the opposite ends of the rolling sleeve seal are attached to the load chamber assembly and the damping chamber assembly, it is preferred that it be tapered along its length so that the end attached to end cap 20 will have a diameter permitting it to lie against and be supported by the inner surface of tube 12 and the end attached to orifice plate 50 will have a diameter permitting it to lie against and be supported by the outer surface of tube 44.

The above-described preferred embodiment of the invention is used and operates as follows: Flange 8 is secured to an equipment platform e.g., a platfrom platform supports shock-sensitive equipment, while the pendulum rod is secured to the ceiling (sometimes by means of a pendent element). In practice, the platform is suspended by a number of such devices. Additionally, the load and damping chambers 68 and 130 are pressurized with fluid to a suitable level, e.g., 100–300 psi. Pressurization of chambers 68 and 130 may be performed before or after the device is installed, depending upon the nature of the installation. As a consequence of the pressurization, the platform is supported by a column of compressed air in the load and damping chambers. If now the installation is subjected to a shock force or a series of vibrations tending to displace the supported platform, a force out of phase with the platform displacement is produced due to gas flow from one to the other of the load and damping chambers. The phase difference results from an increase or decrease of gas in the load chamber due to the gas flow. The net effect of this out-of-phase force is observed as damping of the platform displacement. The frequency of vibration and the damping is influenced by a number of factors, i.e., hole diameter, length and end configuration, which determine the effective cross-sectional area of orifice 112, and which controls the rate of fluid flow between the load and damping chambers. When the displacement is such as to cause the pendulum rod to move away from flange 8, the sleeve seal 74 rolls off of tube 12 on to tube 44. If the displacement is such as to cause the pendulum rod to move toward flange 8, sleeve seal 74 rolls off of tube 44 onto tube 12. In the former case gas is formed from load chamber 130 into damping chamber 68. In the latter case gas is caused to flow from damping chamber 68 into load chamber 130.

Although the improved sleeve seal clamping means has been described in connection with a pneumatic isolator, it is to be appreciated that the invention is applicable to other forms of pneumatic springs and other pneumatic devices employing a rolling sleeve seal.

It is to be recognized also that the sleeve is susceptible of being practiced other than as herein described. Thus, the number and sizes of the ribs on each sealing member may be varied, although it is preferred for practical purposes that at least one of each pair of cooperating sealing members have at least two ribs. Still other modifications will be obvious to persons skilled in the art.

The advantages of pneumatic springs and particularly pneumatic shock and vibration isolators embodying the present invention are as stated in the foregoing statement of objects.

What is claimed is:

1. A pneumatic spring device comprising first and second assemblies disposed in displaceable relation to each other, a flexible rolling sleeve seal having first and second ends and a predetermined wall thickness, first and second means hermetically securing said first and second ends to said first and second assemblies so as to form an expandable-contractable pressure chamber therebetween, and a gaseous fluid within and pressurizing said pressure chamber, at least said first means comprising a first outer sealing member having an inner surface and a second inner sealing member having an outer surface disposed in concentric relation to each other and sized so as to provide an annular gap between said inner and outer surfaces, a portion of each of said surfaces having at least one circumferentially extending rib and at least one circumferentially extending groove with the radial distance between a rib on one surface and a rib on the other surface being less than said wall thickness and the radial distance between a groove on one surface and a groove on the other surface being greater than said wall thickness, said first tend of said rolling sleeve being disposed in said annular gap with some portions thereof substantially filling the grooves in said inner and outer surfaces and other portions thereof being compressed by said ribs.

2. A pneumatic device according to claim 1 wherein said second means comprises a first outer sealing member and a second inner sealing member as defined in claim 1 and the said second end of said rolling sleeve seal is disposed between and gripped by the first and second sealing members of said second means.

3. A pneumatic device according to claim 1 wherein said ribs have the general configuration of a saw tooth in cross-section.

4. A pneumatic device according to claim 2 wherein said grooves also have the general configuration of a saw tooth in cross-section.

5. A pneumatic device according to claim 3 wherein said ribs each comprise first and second converging surfaces with one of said converging surfaces extending approximately radially of the sealing member of which it is a part and the other of said converging surfaces extending at an oblique angle to the axis of the sealing member of which it is a part, and further wherein said rib surfaces are disposed so that a tension force on said rolling sleeve seal will urge said sleeve seal toward the first converging surface and away from the second converging surface of each rib.

6. A pneumatic actuator according to claim 1 wherein at least one of said sealing members has at least two ribs with the distances between said at least two ribs and the center axis of said one sealing member being different.

7. A pneumatic device according to claim 1 wherein said first and second assemblies are disposed in concentric telescoping relation with each other.

8. A pneumatic device according to claim 1 wherein said second assembly comprises a tube, means closing off said tube so as to form a second pressure chamber, and at least one opening in said last-mentioned means providing fluid communication between said pressure chambers.

9. A pneumatic device according to claim 8 wherein said first assembly also comprises a tube, and further wherein said rolling sleeve seal extends along and is convoluted between said tubes.

10. A pneumatic device according to claim 9 wherein the tube of said first assembly surrounds and is in spaced concentric relation to the tube of said second assembly.

11. A pneumatic device according to claim 1 wherein said first and second assemblies include means for connecting said device between two supports that are capable of displacement relative to one another.

12. A pneumatic device according to claim 1 including an elongate housing containing said first and second assemblies, said first assembly comprising an end wall affixed to said housing, a first tube extending longitudinally of said housing and having one end affixed to said end wall, and means including said first means and a first end plate with an orifice affixed to and closing off the opposite end of said first tube, said second assembly comprising a second tube surrounding and spaced from said first tube, means slidably supporting said second tube within said housing, and means including said second means and a second end plate affixed to and closing off one end of said second tube, said rolling sleeve seal being convoluted and extending between said first and second tubes, said pressure chamber being defined by said rolling sleeve seal, said first end plate and said second end plate, and said first end wall, said first tube and said first end plate defining a second pressure chamber that communicates with said first-mentioned pressure chamber via said orifice.

13. A pneumatic device according to claim 12 wherein said end wall includes a passageway that communicates with ambient, and further including valve means connected to said passageway for admitting a fluid under pressure to said second pressure chamber.

14. A pneumatic device according to claim 12 further including a rod for attaching one end of said device to a structure exterior of said device and means providing a swivel connection between said rod and said second tube.

15. In a pneumatic spring device comprising first and second relatively displaceable assemblies and a rolling sleeve seal convoluted and extending between said assemblies so as to form a fluid pressure chamber between said assemblies, improved means for securing one of the opposite ends of said rolling sleeve seal to one of said assemblies, said improved means comprising first and second concentric spaced sealing members engaging and gripping the inner and outer surfaces of said one end of said rolling sleeve seal, said first and second members each having at least one circumferentially extending rib engaging and radially compressing said one end of said seal, said ribs each having a first relatively long side and a second relatively short side in converging relation to each other so that each rib has the general shape of a sawtooth in cross-section, said longer sides of said ribs being nearer than said shorter sides to the opposite end of said rolling sleeve seal.

* * * * *

PO-1050
(5/69)

UNITED STATES PATENT OFFICE
CERTIFICATE OF CORRECTION

Patent No. 3,788,628          Dated January 29, 1974

Inventor(s) Kenneth J. Hotz et al

It is certified that error appears in the above-identified patent and that said Letters Patent are hereby corrected as shown below:

In claim 1, column 7, line 45, change "tend" to --end--.

Signed and sealed this 9th day of April 1974.

(SEAL)
Attest:

EDWARD M. FLETCHER, JR.
Attesting Officer

C. MARSHALL DANN
Commissioner of Patents